United States Patent
Cheng

(10) Patent No.: US 9,094,998 B2
(45) Date of Patent: Jul. 28, 2015

(54) METHOD OF DATA TRANSMISSION IN A WIRELESS NETWORK SYSTEM BY OPTIMIZING WINDOW SIZE SCALING OF COMMUNICATION PROTOCOL

(75) Inventor: Tsung-Yo Cheng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 731 days.

(21) Appl. No.: 13/350,829

(22) Filed: Jan. 16, 2012

(65) Prior Publication Data

US 2013/0114520 A1    May 9, 2013

(30) Foreign Application Priority Data

Nov. 7, 2011 (TW) .............................. 100140599 A

(51) Int. Cl.
| | |
|---|---|
| H04W 80/06 | (2009.01) |
| H04L 12/807 | (2013.01) |
| H04L 29/06 | (2006.01) |
| H04W 28/02 | (2009.01) |
| H04L 12/801 | (2013.01) |

(52) U.S. Cl.
CPC .............. *H04W 80/06* (2013.01); *H04L 47/27* (2013.01); *H04L 69/163* (2013.01); *H04W 28/0205* (2013.01); *H04L 47/14* (2013.01)

(58) Field of Classification Search
CPC .................................................. H04W 80/06
USPC .................................................. 370/216, 329
See application file for complete search history.

(56) References Cited

U.S. PATENT DOCUMENTS

| | | | |
|---|---|---|---|
| 6,370,114 B1 * | 4/2002 | Gullicksen et al. ........... | 370/229 |
| 7,843,831 B2 * | 11/2010 | Morrill et al. ................. | 370/235 |
| 8,000,235 B2 * | 8/2011 | Noy et al. ..................... | 370/230 |
| 8,031,648 B2 | 10/2011 | Ishii | |
| 8,064,391 B2 * | 11/2011 | Kozisek et al. ............... | 370/329 |
| 8,098,579 B2 * | 1/2012 | Ray et al. ..................... | 370/230 |
| 8,125,904 B2 * | 2/2012 | Lund ............................. | 370/231 |
| 8,351,328 B2 * | 1/2013 | Sagfors et al. ................ | 370/229 |
| 8,472,379 B2 * | 6/2013 | Ishii et al. .................... | 370/328 |
| 8,824,281 B2 * | 9/2014 | Ramakrishnan et al. ..... | 370/229 |
| 2001/0023453 A1 * | 9/2001 | Sundqvist .................... | 709/232 |
| 2005/0169305 A1 | 8/2005 | Mori | |
| 2008/0085717 A1 | 4/2008 | Chhabra | |
| 2010/0067396 A1 | 3/2010 | Cui | |
| 2011/0106969 A1 * | 5/2011 | Choudhury et al. .......... | 709/236 |

FOREIGN PATENT DOCUMENTS

| | | |
|---|---|---|
| CN | 101517539 A | 8/2009 |
| TW | 200835272 | 8/2008 |
| WO | 2007091924 A1 | 8/2007 |

\* cited by examiner

*Primary Examiner* — Anh-Vu Ly
*Assistant Examiner* — Abdullahi Ahmed
(74) *Attorney, Agent, or Firm* — Winston Hsu; Scott Margo

(57) ABSTRACT

In a wireless network system which adopts a multi-layer data transmission structure, a wireless channel is established between a user equipment and a base station. When a first layer operates using an initial TCP/IP window size, a signal transmission status and a current signal transmission parameter of a second layer are measured. If the signal transmission status does not meet a predetermined standard, the first layer is configured to operate according to an adjusted TCP/IP window size which is associated with the current signal transmission parameter. The first layer is hierarchically higher than the second layer in the multi-layer data transmission structure.

7 Claims, 4 Drawing Sheets

| CQI value | TBS | Code coun | Modulation | TCP/IP window size |
|---|---|---|---|---|
| 0 | N/A | | | |
| 1 | 137 | 1 | QPSK | WS1 |
| 2 | 173 | 1 | QPSK | WS2 |
| 3 | 233 | 1 | QPSK | WS3 |
| 4 | 317 | 1 | QPSK | WS4 |
| 5 | 377 | 1 | QPSK | WS5 |
| 6 | 461 | 1 | QPSK | WS6 |
| 7 | 650 | 2 | QPSK | WS7 |
| 8 | 792 | 2 | QPSK | WS8 |
| 9 | 931 | 2 | QPSK | WS9 |
| 10 | 1262 | 3 | QPSK | WS10 |
| 11 | 1483 | 3 | QPSK | WS11 |
| 12 | 1742 | 3 | QPSK | WS12 |
| 13 | 2279 | 4 | QPSK | WS13 |
| 14 | 2583 | 4 | QPSK | WS14 |
| 15 | 3319 | 5 | QPSK | WS15 |
| 16 | 3565 | 5 | 16-QAM | WS16 |
| 17 | 4189 | 5 | 16-QAM | WS17 |
| 18 | 4664 | 5 | 16-QAM | WS18 |
| 19 | 5287 | 5 | 16-QAM | WS19 |
| 20 | 5887 | 5 | 16-QAM | WS20 |
| 21 | 6554 | 5 | 16-QAM | WS21 |
| 22 | 7168 | 5 | 16-QAM | WS22 |
| 23 | 9719 | 7 | 16-QAM | WS23 |
| 24 | 11418 | 8 | 16-QAM | WS24 |
| 25 | 14411 | 10 | 16-QAM | WS25 |
| 26 | 17237 | 12 | 16-QAM | WS26 |
| 27 | 21754 | 15 | 16-QAM | WS27 |
| 28 | 23370 | 15 | 16-QAM | WS28 |
| 29 | 24222 | 15 | 16-QAM | WS29 |
| 30 | 25558 | 15 | 16-QAM | WS30 |

FIG. 3

METHOD OF DATA TRANSMISSION IN A WIRELESS NETWORK SYSTEM BY OPTIMIZING WINDOW SIZE SCALING OF COMMUNICATION PROTOCOL

BACKGROUND OF THE INVENTION

1. Field of the Invention

The present invention is related to a method of data transmission in a wireless network system, and more particularly, to a method of data transmission in a wireless network system by optimizing window size scaling of communication protocol.

2. Description of the Prior Art

With rapid development in technology, a user may easily connect to a network using desktop computers, notebook computers, personal digital assistants (PDAs) or smart phones. In order for electronic equipment having varying specifications to be able to communicate with the same network, an OSI (Open Systems Interconnection) network model has been provided by ISO (International Organization for Standardization) for managing the network intercommunication between two systems. Meanwhile, transmission control protocol (TCP)/Internet protocol (IP), developed by IETF (Internet engineer task force) according to DoD (department of defense) model, is the most common standard network protocol.

The OSI model and the TCP/IP define various layers for network transmission. In a network environment, each layer of a receiving device or a transmitting device is configured to recognize data from the same layer. Data packets are sequentially transmitted from the top layer to the bottom layer of a transmitting network device and then to a receiving network device using application programs. After receiving data packages, the receiving network device sequentially unpacks each data package, which is then distributed to a corresponding layer of the receiving network device. Assigned for different tasks, each layer may have varying transmission parameters and buffer sizes. Data stall may happen when transmitting data from a fast higher layer to a slow lower layer. Also, a fast lower layer may not be able to improve data throughput if a higher layer encounters insufficient data buffer or transmission blockages.

SUMMARY OF THE INVENTION

The present invention provides a method of data transmission between a user equipment and a base station in a wireless network system having a multi-layer structure. The method includes establishing a wireless channel between the user equipment and the base station; operating a first layer in the wireless channel according to an initial data transmission rate and detecting a signal transmission status of the wireless channel and a current signal transmission parameter of a second layer in the wireless channel; and operating the first layer according to an adjusted data transmission rate when the signal transmission status does not meet a predetermined standard, wherein the first layer is hierarchically higher than the second layer in the multi-layer structure and the adjusted data transmission rate is associated with the current signal transmission parameter.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 3 and 4 are diagrams illustrating a method of data transmission in a wireless network system according to the present invention.

DETAILED DESCRIPTION

The present invention provides a method of data transmission in a wireless network system. When a user equipment and a base station in the wireless network system are in communication using a multi-layer structure, the present invention may improve overall data throughput.

Figure 1:
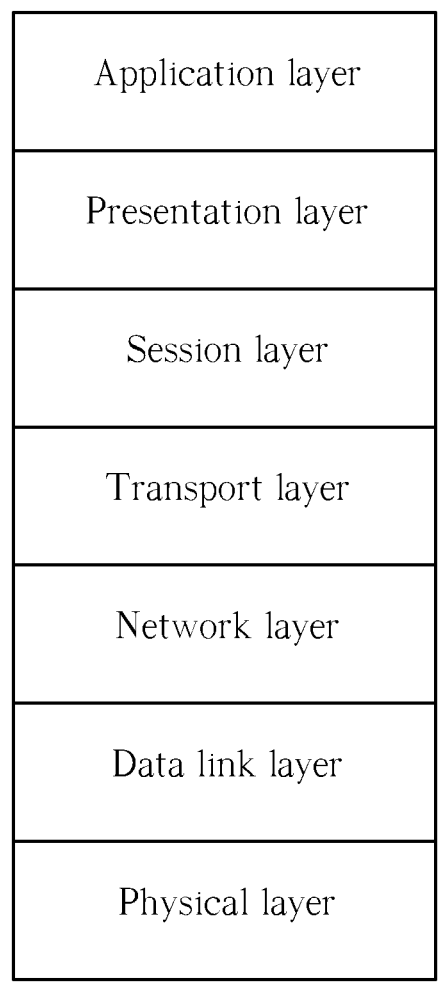
FIG. 1 is a diagram illustrating a multi-layer structure according to the OSI model.

FIG. 1 is a diagram illustrating a multi-layer structure according to the OSI model. From bottom to top, Layer 1-Layer 7 sequentially include physical layer, data link layer, network layer, transport layer, session layer, presentation layer, and application layer. The $1^{st}$ physical layer is defined as the bottom layer closest to hardware devices, while the $7^{th}$ application layer is defined as the top layer closest to software programs. Each layer provides its unique function and may be programmed independently.

The physical layer and the data link layer in the OSI model are configured to handle network hardware connection and may be implemented on various network access interfaces, such as Ethernet, Token-Ring or FDDI, etc. The network layer in the OSI model is configured to deliver messages between a transmitting device and a receiving device using various protocols, such as identifying addresses or selecting transmission path using IP, ARP, RARP or ICMP. The transport layer in the OSI model is configured to deliver messages between different hosts using TCP and UDP. The session layer, the presentation layer, and the application layer in the OSI model are configured to provide various application protocols, such as TELNET, FTP, SMTP, POP3, SNMP, NNTP, DNS, NIS, NFS, and HTTP. The present invention may be applied to any wireless network system having a multi-layer structure for data transmission. FIG. 1 is only for illustrative purpose, and does not limit the scope of the present invention.

Figure 2:
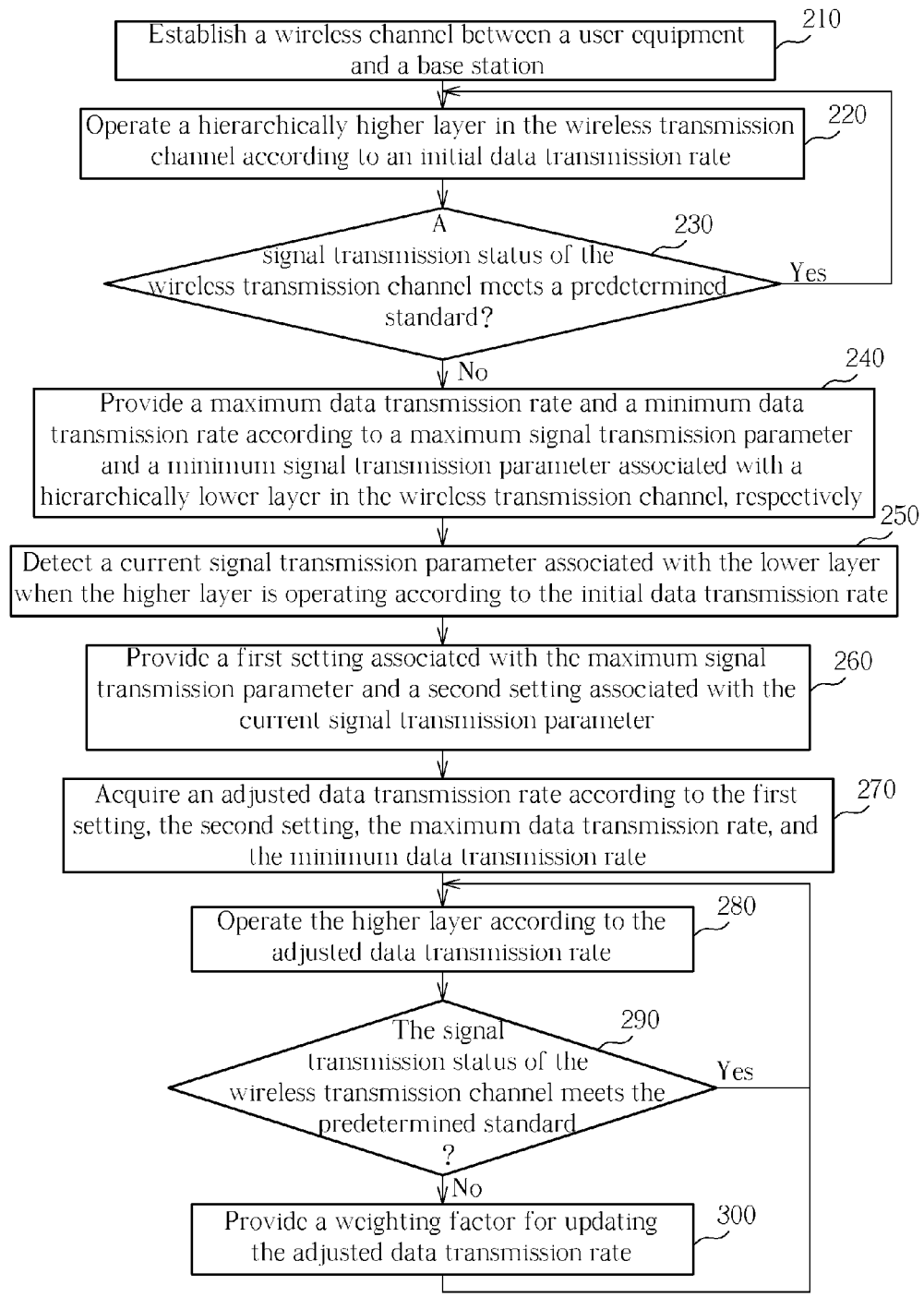
FIG. 2 is a flowchart illustrating a method of data transmission in a wireless network system according to the present invention.

FIG. 2 is a flowchart illustrating a method of data transmission in a wireless network system according to the present invention. The flowchart in FIG. 2 includes the following steps:

Step 210: establish a wireless channel between a user equipment and a base station.

Step 220: operate a hierarchically higher layer in the wireless channel according to an initial data transmission rate; execute step 230.

Step 230: determine whether a signal transmission status of the wireless channel meets a predetermined standard; if yes, execute step 220; if no, execute step 240.

Step 240: provide a maximum data transmission rate and a minimum data transmission rate according to a maximum signal transmission parameter and a minimum signal transmission parameter associated with a hierarchically lower layer in the wireless channel, respectively; execute step 250.

Step 250: detect a current signal transmission parameter associated with the lower layer when the higher layer is operating according to the initial data transmission rate; execute step 260.

Step 260: provide a first setting associated with the maximum signal transmission parameter and a second setting associated with the current signal transmission parameter; execute step 270.

Step 270: acquire an adjusted data transmission rate according to the first setting, the second setting, the maximum data transmission rate, and the minimum data transmission rate; execute step 280.

Step 280: operate the higher layer according to the adjusted data transmission rate; execute step 290.

Step 290: determine whether the signal transmission status of the wireless channel meets the predetermined standard; if yes, execute step 280; if no, execute step 300.

Step 300: provide a weighting factor for updating the adjusted data transmission rate; execute step 280.

In the multi-layered OSI network system which adopts TCP/IP depicted in FIG. 1, the hierarchically lower layer may be the physical layer, while the hierarchically higher layer may be the transport layer or the network layer. The signal transmission status may be a data transmission error rate or a data re-transmission percentage. The signal transmission parameter may be acquired by measuring a channel quality indicator (CQI) when corresponding layers of the user equipment and the base station are in communication. The data transmission rate may be a protocol window size of the transport layer or the network layer.

For example, the transport layer in the OSI model normally adopts TCP for handling packet sequence number, acknowledgement packets, checksum and re-transmission. The network layer in the OSI model normally adopts IP for handling addressing, routing, service type specification, packet fragmentation, packet reassembling and security. Therefore, the data transmission rate may be TCP/IP window size which indicates the maximum packet number permitted to be transmitted without waiting for acknowledgement packets. However, the present invention may adjust other parameters associated with data transmission rate according to other signal transmission parameters. CQI and TCP/IP window size are merely illustrative embodiments, and do not limit the scope of the present invention.

A high-speed downlink packet access (HSDPA) network system may adopt various types of user equipment, each of which is provided with a corresponding CQI table. FIG. 3 is a table illustrating the present invention using a category 10 UE. The CQI table corresponding to category 10 UE is depicted on the left side of the table in FIG. 3, while the two columns on the right side of the table in FIG. 3 illustrate a method of executing step 240. In the CQI table depicted on the left side of FIG. 3, the CQI value is between 0 and 30, and related to parameters of the wireless channel, such as signal-to-noise ratio (SNR), signal-to-interference plus noise ratio (SINR), or signal-to-noise plus distortion ratio (SNDR). Measured during intercommunication between corresponding layers of the user equipment and the base station, a larger CQI value indicates a better signal transmission status. Each CQI value corresponds to specific settings, wherein transport block size (TBS) represents the amount of data packets which are transmitted to the user equipment, code count represents the amount of high speed physical downlink shared channel (HS-PDSCH), and data packets maybe transmitted using a quadrature phase-shift keying (QPSK) modulation or a high-speed 16 quadrature amplitude modulation (16-QAM) modulation.

In step 210, the wireless channel may be established between the user equipment and the base station. Next, step 220 may be executed for operating the higher layer according to the initial data transmission rate. In the embodiment of the present invention, the initial data transmission rate may be selected from the TCP/IP window sizes WS1-WS30.

In step 230, when it is determined that the signal transmission status of the wireless channel meets the predetermined standard (such as when the data transmission error rate or data re-transmission percentage is lower than a predetermined value), step 220 may be executed again for operating the higher layer according to the initial data transmission rate. When it is determined that the signal transmission status of the wireless channel does not meet the predetermined standard (such as when the data transmission error rate or data re-transmission percentage is larger than a predetermined value), step 240 may then be executed.

In step 240, the maximum data transmission rate and the minimum data transmission rate may be provided according to the maximum signal transmission parameter and the minimum signal transmission parameter associated with the lower layer. As illustrated on the right side of the table in FIG. 3, each measured CQI value may be mapped to a corresponding TCP/IP window size, wherein WS1≤WS2≤ . . . ≤WS30. For illustrative purposes, it is assumed that the maximum TCP/IP window size WS30 is equal to 4000K bits, while the minimum TCP/IP window size WS1 is equal to 10K bits.

In step 250, the current signal transmission parameter of the lower layer (such as the current CQI value of the lower layer) may be detected when the higher layer is operating according to the initial data transmission rate. For illustrative purposes, it is assumed that the detected current CQI value is equal to 16.

In step 260, the first setting associated with the maximum signal transmission parameter and the second setting associated with the current signal transmission parameter may be provided. For illustrative purposes, it is assumed that the maximum signal transmission parameter is a CQI value equal to 30 and the minimum signal transmission parameter is a CQI value equal to 16. Therefore, the first setting may be a TBS equal to 25558 and the second setting may be a TBS equal to 3565.

In step 270, the adjusted data transmission rate may be acquired according to the first setting, the second setting, the maximum data transmission rate, and the minimum data transmission rate. The following equation (1) illustrates a method for executing step 270 according to an embodiment of the present invention.

$$\text{Adjusted data transmission rate} = (\text{maximum data transmission rate} - \text{minimum data transmission rate}) * (\text{second setting}/\text{first setting}) \quad (1)$$

For illustrative purposes, it is assumed that the maximum data transmission rate is the TCP/IP window size WS30 equal to 4000K bits, the minimum data transmission rate is the TCP/IP window size WS1 equal to 10K bits, the first setting is a TBS equal to 25558 which is associated with the maximum CQI value equal to 30, and the second setting is a TBS equal to 3565 which is associated with the current CQI value equal to 16. After applying the above values to equation (1), the adjusted data transmission rate may be acquired, as illustrated in the following equation (2):

$$\text{Adjusted data transmission rate} = \quad (2)$$
$$(4000K - 10K) * (3565/25558) = 556$$

In step 280, the higher layer may function according to the adjusted data transmission rate provided in step 270. For example, the transmission block size may be adjusted to 556 before executing step 290. In step 290, when it is determined that the signal transmission status of the wireless channel meets the predetermined standard, step 280 may be executed again for operating the higher layer according to the adjusted data transmission rate. When it is determined that the signal transmission status of the wireless channel does not meet the predetermined standard, step 300 may be executed.

In step 300, the weighting factor may be provided for updating the adjusted data transmission rate. The following equation (3) illustrates a method for executing step 300 according to an embodiment of the present invention.

$$\text{Adjusted data transmission rate} = (\text{maximum data transmission rate} - \text{minimum data transmission rate}) * (\text{second setting}/\text{first setting}) * (\text{weighting factor}) \quad (3)$$

Figure 4:
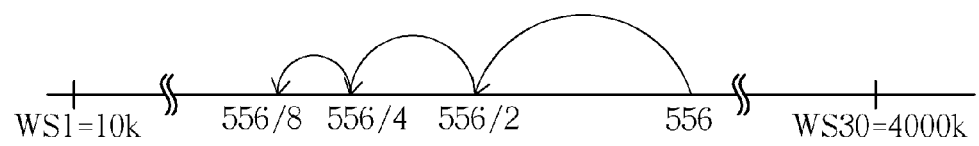

FIG. 4 is a diagram illustrating a method for executing step 300 according to an embodiment of the present invention. If the signal transmission status of the wireless channel still does not meet the predetermined standard when operating the higher layer according to the adjusted data transmission rate, the adjusted data transmission may be updated according to the weighting factor until the signal transmission status of the wireless channel meets the predetermined standard. For example, if the weighting factor is equal to 0.5, the value of the adjusted data transmission is halved after each update, as depicted in FIG. 4.

As known to those skilled in the art, the concept of sliding window is used in TCP/IP for allowing multiple packets to be transmitted before the receiving device accepts acknowledgement packets. This kind of multi-transmission-multi-acknowledgement technology can increase network bandwidth utilization and the data transmission speed. The present invention may optimize the data transmission between different layers by dynamically adjusting the TCP/IP window size of the higher layer according to the measured CQI value of the lower layer. In other words, if the wireless network system faces data stall due to an inadequate TCP/IP window size, the present invention may dynamically adjust the TCP/IP window size to an optimized value, thereby capable of improving overall data throughput.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of data transmission between a user equipment and a base station in a wireless network system having a multi-layer structure, comprising:
    establishing a wireless channel between the user equipment and the base station;
    operating a first layer in the wireless channel according to an initial data transmission rate and detecting a signal transmission status of the wireless channel and a current signal transmission parameter of a second layer in the wireless channel;
    providing a maximum data transmission rate and a minimum data transmission rate according to a maximum signal transmission parameter and a minimum signal transmission parameter associated with the second layer;
    providing a first setting associated with the maximum signal transmission parameter and a second setting associated with the current signal transmission parameter;
    acquiring an adjusted data transmission rate according to the first setting, the second setting, the maximum data transmission rate, and the minimum data transmission rate; and
    operating the first layer according to the adjusted data transmission rate when the signal transmission status does not meet a predetermined standard, wherein:
        the multi-layer structure is an open systems interconnection (OSI) network structure;
        the first layer is a physical layer;
        the second layer is a network layer or a transport layer;
        the first layer is hierarchically higher than the second layer in the multi-layer structure; and
        the adjusted data transmission rate is dynamically associated with the current signal transmission parameter.

2. The method of claim 1, wherein the adjusted data transmission rate is proportional to a difference between the maximum signal transmission rate and the minimum signal transmission rate, inversely proportional to the first setting, and proportional to the second setting.

3. The method of claim 1, further comprising:
    reducing the adjusted data transmission rate if the signal transmission status does not meet the predetermined standard when operating the first layer according to the adjusted data transmission rate; and
    operating the first layer according to the reduced adjusted data transmission rate.

4. The method of claim 1, wherein the signal transmission status is a data transmission error rate or a data re-transmission percentage of the wireless channel.

5. The method of claim 1, wherein the signal transmission parameter is a channel quality indicator (CQI) of the second layer.

6. The method of claim 1, wherein the initial data transmission rate and the adjusted data transmission rate are different transmission control protocol (TCP) window sizes of the first layer.

7. The method of claim 1, wherein the initial data transmission rate and the adjusted data transmission rate are different Internet protocol (IP) window sizes of the first layer.

* * * * *